United States Patent [19]

Danieau

[11] Patent Number: 5,478,274
[45] Date of Patent: Dec. 26, 1995

[54] HEATING AND VENTILATING, AND/OR AIR CONDITIONING, APPARATUS FOR THE CABIN OF A MOTOR VEHICLE, ESPECIALLY AN ELECTRIC VEHICLE

[75] Inventor: Jacques Danieau, Noisy le Roi, France

[73] Assignee: Valeo Thermique Habitacle, Les Mesnil Saint-Denis, France

[21] Appl. No.: 262,468

[22] Filed: Jun. 20, 1994

[30] Foreign Application Priority Data

Jun. 23, 1993 [FR] France .................................. 93 07652

[51] Int. Cl.$^6$ ..................................................... B60H 1/03
[52] U.S. Cl. .......................... 454/126; 165/43; 219/202; 454/139; 454/158; 454/160
[58] Field of Search ......................... 165/42, 43; 219/202, 219/203; 237/12.3 A; 392/379; 454/121, 124, 126, 127, 139, 148, 158, 159, 160, 161

[56] References Cited

U.S. PATENT DOCUMENTS

| | | | |
|---|---|---|---|
| 2,780,077 | 2/1957 | Jacobs | 165/43 X |
| 3,300,619 | 1/1967 | Nilssen | 165/43 X |
| 4,289,195 | 9/1981 | Bellot et al. | 165/42 X |
| 4,465,123 | 8/1984 | Sarsten et al. | |

FOREIGN PATENT DOCUMENTS

| | | | |
|---|---|---|---|
| 589516 | 12/1959 | Canada | 165/42 |
| 0538131 | 4/1993 | European Pat. Off. | |
| 2667829 | 4/1992 | France | |
| 56-128214 | 10/1981 | Japan | |
| 59-167316 | 9/1984 | Japan | |
| 61-33314 | 2/1986 | Japan | |
| 2095872 | 10/1982 | United Kingdom | |
| 2224828 | 5/1990 | United Kingdom | |
| 9216389 | 10/1992 | WIPO | |

*Primary Examiner*—Harold Joyce
*Attorney, Agent, or Firm*—Morgan & Finnegan

[57] ABSTRACT

An apparatus for heating and ventilating, and/or air conditioning, the cabin of a motor vehicle, and in particular an electric vehicle, comprises a series of elements arranged in a generally horizontal succession along the longitudinal axis of the vehicle. These elements comprise: a blower for producing a stream of cold air; a first duct fed by the blower and divided into a cold air transmission branch and an air heating branch which contains a heat recuperator; a selection flap valve for controlling the distribution of the air flow between the two branches; a second duct which receives the outlet air of both of the two branches of the first duct, and which contains at least one electric radiant heater; and a distributor fed by the second duct and including a distribution valve for distributing the cold or heated air between appropriate ventilating ports in the cabin.

12 Claims, 2 Drawing Sheets

HEATING AND VENTILATING, AND/OR AIR CONDITIONING, APPARATUS FOR THE CABIN OF A MOTOR VEHICLE, ESPECIALLY AN ELECTRIC VEHICLE

FIELD OF THE INVENTION

This invention relates to heating and ventilating apparatus, which may also include an air conditioning facility, for the cabin of a motor vehicle, and especially for a motor vehicle with electrical propulsion.

BACKGROUND OF THE INVENTION

French patent application No. 93 04272, filed on 9 Apr. 1993 by the present Applicants, describes an apparatus of the above type which comprises elements arranged in succession in a substantially horizontal direction along the longitudinal axis of the vehicle. An apparatus of this type has a particularly compact structure, which enables it to be easily incorporated in the central part of the fascia of the motor vehicle It is most particularly Suitable for vehicles of the kind known as "monocorps" vehicles, in which the driving station and the fascia extend in the longitudinal direction of the vehicle.

In the above mentioned French patent application, the apparatus described therein provides a heating apparatus and a ventilating apparatus each of which has its own separate blower, these two apparatuses being arranged one behind the other.

DISCUSSION OF THE INVENTION

The invention aims essentially to provide an apparatus of the above type which has an even more compact structure, and which may be employed especially in electric vehicles for use in urban traffic. According to the invention, a heating and ventilating, and/or air conditioning, apparatus of the general type described above, for the cabin of a motor vehicle comprises:

a blower for producing a flow of cold air;

a first duct which is fed by the blower and which is divided into two adjacent branches, namely a cold air transmission branch and an air heating branch which contains a heat recuperator;

a selection flap valve for controlling the distribution of the flow of cold air between the two said branches of the first duct;

a second duct which is fed by the two branches of the first duct, and which contains at least one electrical radiant heater; and a distributor which is fed from the second duct and which includes a distributor flap valve for distributing the cold or heated air received from the second duct between ventilation ports which are open into different regions of the cabin of the vehicle.

The apparatus of the invention thus has only one blower, which is arranged to feed, selectively, either the cold air transmission branch or the air heating branch, according to the position in which the selection flap valve is set, and to deliver this cold or heated air into the second duct.

When it is desired to deliver cold air into the cabin, the electrical radiant heater or heaters mounted in the second duct are not energised. On the other hand, when it is required to deliver heated air into the cabin, the electrical radiant heater (or at least one said heater) can be energised in order to provide any additional heat that may be required in addition to that which is supplied by the heat recuperator.

The cold or heated air thus produced is then delivered into the cabin through the distributor, the distributor valve of which is set in the position required by the user.

According to another feature of the invention, the blower is supplied with air through an air admission member, which comprises a duct for admission of fresh air from outside the vehicle and a duct for admission of recirculated air from the cabin.

Preferably, the first duct of the apparatus is constructed as an extension of a casing which is part of the blower and which has the general shape of a volute. This feature is particularly valuable for rendering the apparatus more compact.

The selection flap valve is preferably in the form of a flap which is mounted for pivoting movement within the first duct, the valve having a curved form which is adapted to match the shape of the volute of the blower casing. The curved form of the flap valve facilitates the motion of the air within the blower casing.

According to a further feature of the invention, the apparatus further includes an air filter arranged downstream of the blower. This filter is preferably arranged between the first duct and the second duct, so that both the cold air received from the cold air transmission branch, and the heated air received from the air heating branch, have to pass through the filter.

In the case where the apparatus according to the invention is for a vehicle having an electric propulsion motor, the heat exchanger mounted in the air heating branch is preferably a radiant heat exchanger which recovers heat produced by the electric propulsion motor.

According to yet another preferred feature of the invention, there are two said electric radiant heaters in the second duct of the apparatus, with each of these heaters having separate control means. These heaters either supply heat which is complementary to that provided by the heat recuperator, or they supply heat when the energy produced by the recuperator is insufficient.

According to another feature of the invention, the distributor is connected to a deicing/demisting port for the windshield of the vehicle, to at least one ventilating port arranged on the fascia, and to at least one further ventilating port which is oriented towards the floor of the vehicle.

The distribution valve is preferably connected to control means which are capable of setting it in various selected positions. In each of these positions, cold or heated air received from the second duct can be directed towards no more than two ventilating ports at any one time.

In a more complex version of the apparatus, the latter also includes an evaporator which is adapted to produce conditioned air and which is disposed between the distributor and at least one ventilating port which is open in the fascia of the vehicle.

The invention is most particularly applicable to an apparatus in which the various elements described above are disposed on either side of a transverse bulkhead which separates the cabin from the front motor compartment of the vehicle. In that case, the blower, the first duct and the second duct are preferably arranged on the engine compartment side, i.e. in front of the bulkhead, while the distributor is arranged on the cabin side, i.e. behind the bulkhead.

A preferred feature of the invention will be described below by way of example only and with reference to the accompanying drawings.

DESCRIPTION OF A PREFERRED EMBODIMENT OF THE INVENTION

Figure 1:
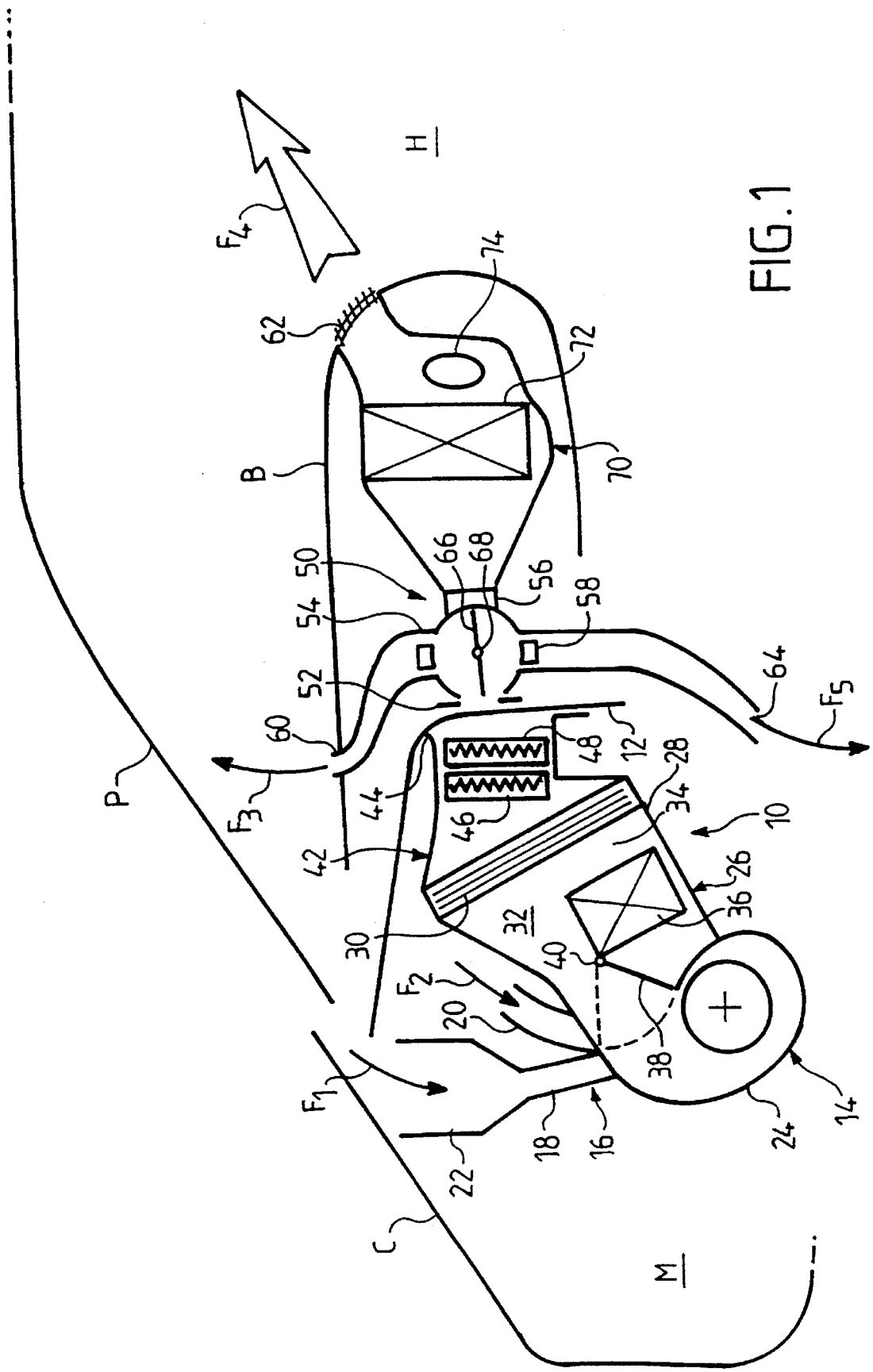
FIG. 1 is a diagrammatic view showing part of a motor vehicle in longitudinal cross section, the vehicle being of the monocorps type and being equipped with an apparatus in accordance with the invention.

Reference is first made to FIG. 1, which shows an apparatus 10 for heating and ventilating, and/or air conditioning, the cabin of the vehicle. The apparatus 10 comprises elements Which are disposed on both sides of a transverse bulkhead 12 which separates the cabin H from the front motor compartment M of the vehicle. In this example the vehicle is of the "monocorps" type, in which the windshield P is steeply inclined and forms what is substantially art extension of the motor hood C. The apparatus 10 comprises elements which are disposed in succession in a substantially horizontal direction along the longitudinal axis of the vehicle. The apparatus is at least partly housed in the central part of the fascia B of the vehicle. The apparatus 10 includes an air blower 14, which is fed through an air admission member 16 having a fresh air inlet duct 18. The air blower 14 draws fresh air from outside the vehicle as indicated by the arrow F1. The blower 14 also has a recirculated air inlet 20, through which it draws air in the direction of the arrow F2 from inside the cabin H. The fresh air inlet duct 18 is connected to a separator 22, the purpose of which is to separate rainwater from the fresh air drawn from outside the vehicle, below the windshield P. A control means (which is not shown) enables the source of the air supply to the blower 14 to be selected so that the latter draws air through either the fresh air inlet duct 18 or the recirculated air inlet 20.

The air blower 14 has a casing 24 which is generally in the form of a volute, and which is extended by a first duct 26, which is again mounted within the motor compartment M. The first duct 26 may be formed integrally with the casing 24, or it may be separate, but connected, to the latter. The duct 26 is divergent progressively away from the blower casing 24, up to an outlet opening 28 of generally rectangular shape which is provided with a dust filter 30. The first duct 26 is supplied with cold air by the blower 14, and is divided into two adjacent branches, namely a cold air transmission branch 32 and an air heating branch 34 which contains a heat recuperator 36.

In the preferred application of the invention to a vehicle which is propelled by an electric motor, the heat recuperator 36 is in the form of a radiator, which recovers thermal energy from the engine of the vehicle and, if necessary, also thermal energy from the electronic means which are associated with the motor.

A selection flap valve 38 is mounted at the inlet end of the first duct 26. The flap valve 38 is mounted for pivoting movement about an axis 40, so as to control the distribution of the air stream between the two branches 32 and 34. The pivot axis 40 is located close to the recuperator 36, and the valve itself extends forwardly, i.e. upstream, from the axis 40. The flap valve 38 is pivotable between a first end position (shown in full lines in FIG. 1) and a second end position which is shown in broken lines. In the first end position of the value, the air delivered by the blower 14 is forced to flow through the cold air transmission branch 32. In the other end position of the valve, this air delivered by the blower has to pass through the heat recuperator 36 and flow through the air heating branch 34. The flap valve 38 also acts as a bypass valve for orientating the air flow leaving the blower 14, either through the heat recuperator 36, or so as to bypass the latter. The flap valve 38 may of course assume any position intermediate between the two extreme positions mentioned above.

The air stream, whether cold or heated, is filtered by the filter 30, after which it passes into a second duct 42, which is again arranged in the motor compartment M, and which has an outlet opening 44 which is open through a corresponding aperture in the bulkhead 12. The second duct 42, fed through the two branches of the first duct, contains two electrical radiant heaters 46 and 48, which are controlled by separate control means and which are supplied with power from the batteries of the vehicle.

The apparatus also comprises an air distributor 50 which lies on the side .of the cabin H, with respect to the bulkhead 12, and which is arranged in the fascia B. The distributor 50 has an inlet 52 which communicates with the outlet opening 44 of the second duct 42. The distributor also has three outlets 54, 56 and 58. The outlet 54 supplies a deicing/demisting port 60 for the windshield P, which is open at the base of the latter so as to deliver on to the windshield a stream of air in the direction of the arrow F3.

The outlet 56 supplies]air, in particular, to a ventilating port 62 which is arranged in the front part of the fascia B, so as to deliver a stream of air in the direction indicated by the arrow F4. The third outlet 58 supplies another ventilating port 64 which is open towards the floor of the vehicle, and therefore towards the feet of the occupants of the vehicle, so as to deliver a stream of air in the direction indicated by the arrow F5.

The distributor 50 includes a distribution valve of the butterfly type, which is driven in rotation about an axis 68 by means of an electric motor, not shown. The distribution valve 66 may be constructed in the manner described in French patent specification FR 2 503 056. The distribution valve 66 is accordingly connected to control means which put it into various selected settings, in each of which the cold or heated air received from the second duct 42 is able to be directed towards not more than two ventilating ports at the same time. The distribution valve 66 thus enables the cold or warm airstream to be delivered selectively, and in the most direct manner possible, to the ports 60, 62 and 64, with a minimum of mechanical energy loss and thermal energy loss.

Figure 2:
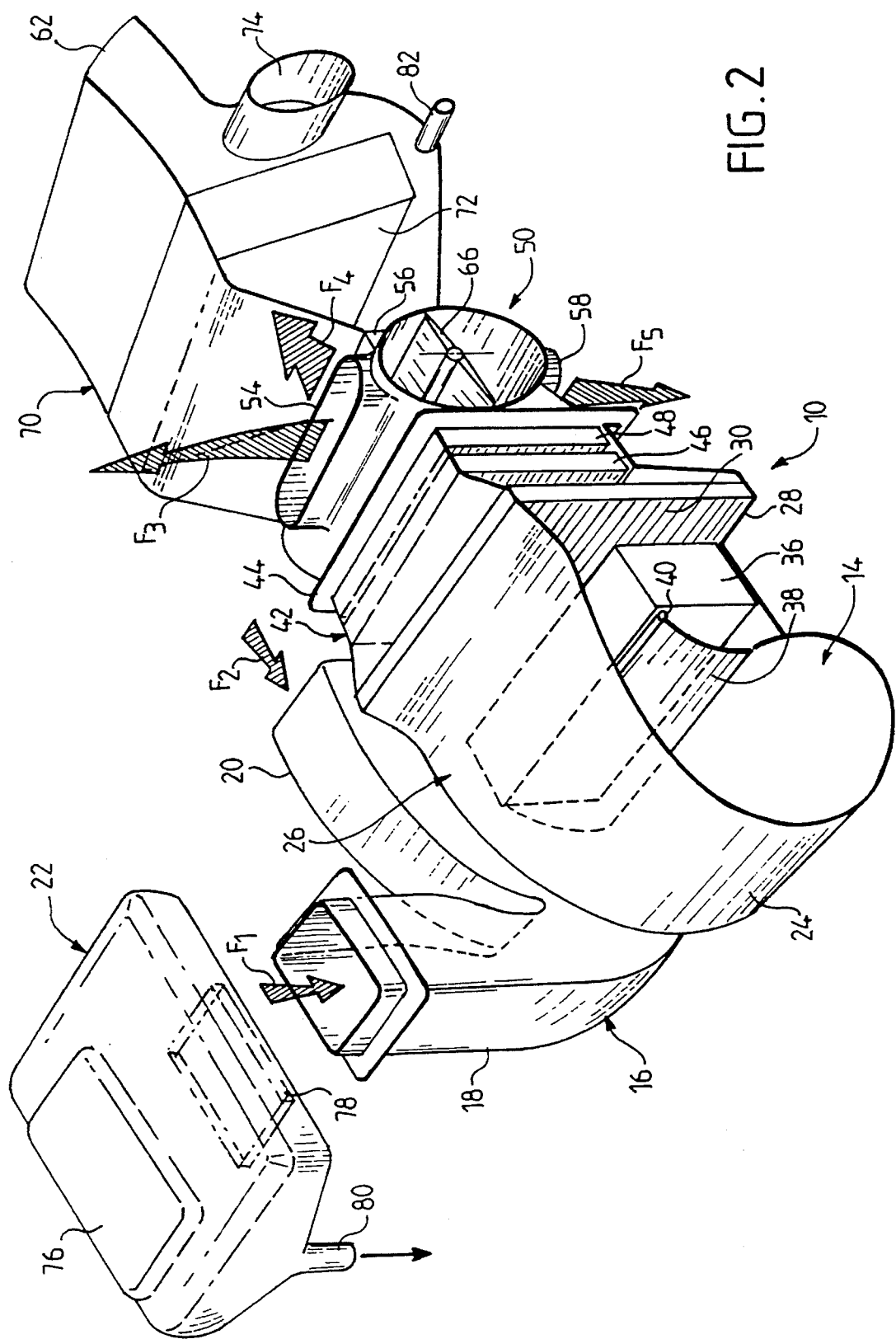
FIG. 2 is an exploded perspective view of the apparatus seen in FIG. 1.

In the embodiment shown here, the outlet 56 of the distributor 50 is connected to a casing 70 which contains an evaporator 72 and which communicates with the ventilating duct or ducts 62 lying in the centre of the fascia. The casing is also in communication with the side ventilating ports (not shown) through two further ducts 72, only one of which can be seen in FIGS. 1 and 2. Thus, the air received in the casing 70 can be cooled by passing through the evaporator 72 before being delivered into the cabin via the appropriate ventilating ports provided on the fascia B. Referring now to FIG. 2, the main elements of the apparatus 10 are shown in perspective in FIG. 2. In particular, the air/water separator structure 22 can be seen. This has an air/water inlet 76, an air outlet 78 which is arranged to communicate with the fresh air inlet duct 18, and an outlet 80 for evacuation of the water. FIG. 2 also shows the selection flap valve 38, which has a curved shape such that it is adapted to the volute-shaped configuration of the casing 24 of the blower 14. The selection valve 38 is shown in the same position as is seen in full lines in FIG. 1.

FIG. 2 also shows the first duct 26 which, in this example, is integral with the blower casing 24; it also shows the second duct 42 connected to the first duct 26. In addition, FIG. 2 shows the distributor 50 with its three outlets 54, 56 and 58, together with the casing 70 in which the evaporator 72 is fitted. The casing 72 includes a mounting spigot 82 by which it is secured in the fascia.

With this apparatus, cold air or warm air, or conditioned air as the Case may be, can be delivered into the cabin through the various ventilating ports in a manner which can be precisely controlled. In the case where it is required to deliver cold air to the cabin, the selection valve 38 is put into the setting indicated in FIG. 1 in full lines, and in FIG. 2. The cold air delivered by the blower 14 passes through the filter 30, and then enters the second duct 42 and passes through the electric radiant heaters 46 and 48, which are not energised. The cold air is then distributed between the various ventilating ports, and, if required, it is cooled bypassing it through the evaporator 72 so as to produce conditioned air.

When warm air is required, the selection valve 38 is put into the setting indicated in broken lines in FIG. 1, or in a suitable intermediate position such that at least part of the air passes through the heat recuperator 36. If the heat transferred to this air by the recuperator 36 is insufficient, at least one of the two electrical radiant heaters 46 and 48 is energised so as to provide additional heat. The warm air thus produced is then distributed between the various ventilating ports by means of the distributor valve 66.

In this way, an apparatus is provided which has a particularly compact structure because it has only one blower, and this adapts the apparatus especially well to use in vehicles of the monocorps type, in particular in vehicles with electric motor propulsion. The compact structure of the apparatus enables the path of the air to be minimised in length; and this, as has been mentioned above in connection with the particular embodiment described, minimises mechanical and thermal energy losses.

What is claimed is:

1. Heating and ventilating apparatus for the cabin of a motor vehicle which defines a longitudinal axis of the vehicle, the apparatus having a plurality of elements disposed one behind the other in a substantially horizontal direction along the longitudinal axis, wherein the elements comprise: an air blower having an outlet for delivering unheated air through said blower outlet; a first duct connected to the blower outlet and defining an unheated air transmission branch and an air heating branch adjacent to the unheated air transmission branch; a heat recuperator in the air heating branch; a selection flap valve between the blower and said first duct, for controlling the distribution of the unheated air from the blower between the two branches of the first duct; a second duct connected to said two branches for receiving air therefrom; at least one electrical radiant heater in the second duct; a distributor including a distribution valve for selectively distributing air received from the second duct; a plurality of ventilation ports for selectively receiving air from the distributor, said ports opening into different regions of the cabin of the vehicle; and duct means connecting each said ventilation port to the distributor.

2. Apparatus according to claim 1, further including a fresh air inlet member upstream of the blower for supplying fresh air to the blower, and a recirculated air inlet upstream of the blower for supplying to the latter air received from the cabin, the fresh air inlet member comprising a fresh air inlet duct for admitting air from outside the vehicle.

3. Apparatus according to claim 1, wherein the blower has a casing having the general shape of a volute, said first duct being connected to said blower casing as an extension thereof.

4. Apparatus according to claim 3, further including pivot means mounting the selection flap valve in said first duct for pivoting movement therein, the selection flap valve having a curved shape adapted to the shape of the blower volute casing.

5. Apparatus according to claim 1, further including an air filter downstream of the blower.

6. Apparatus according to claim 5, wherein the air filter is disposed between said first and second ducts, whereby unheated air from the cold air transmission branch and heated air from the air heating branch has to pass through the filter.

7. Apparatus according to claim 1 for a vehicle having an electric propulsion motor, wherein the heat recuperator is connected with the electric propulsion motor for recovering heat from the motor.

8. Apparatus according to claim 1, having two said electrical radiant heaters in said second duct, and further including separate control means for each said radiant heater.

9. Apparatus according to claim 1, wherein said ventilating ports with which said distributor is connected comprise a windshield deicing and demisting port, at least one ventilating port disposed on the fascia of the vehicle, and at least one ventilating port oriented towards the floor of the vehicle.

10. Apparatus according to claim 1, further including control means connected to the distribution valve for setting the latter in different selected positions, in each of which the air received thereby from said second duct is selectively directed simultaneously towards one and two of said ventilating ports.

11. Apparatus according to claim 1, wherein the said ventilating ports include at least one port which is open on the fascia of the vehicle, the apparatus further including an evaporator for producing conditioned air, disposed operatively between the distributor and at least one said port in the fascia.

12. Apparatus according to claim 1, for a vehicle having a front motor compartment and a transverse bulkhead separating the cabin from said motor compartment, wherein the blower and the first and second ducts are arranged in front of said bulkhead, and the distributor is behind the bulkhead.

* * * * *